United States Patent [19]

Hori et al.

[11] Patent Number: 5,502,550
[45] Date of Patent: Mar. 26, 1996

[54] IMAGE FORMING APPARATUS AND METHOD

[75] Inventors: Kenjiro Hori, Tokorozawa; Satoshi Akiyama, Yokohama; Hideki Suzuki, Yokohama; Takefumi Takubo, Yokohama, all of Japan

[73] Assignee: Canon Kabushiki Kaisha, Tokyo, Japan

[21] Appl. No.: 366,440

[22] Filed: Dec. 30, 1994

Related U.S. Application Data

[63] Continuation of Ser. No. 238,352, May 5, 1994, abandoned, which is a continuation of Ser. No. 934,261, Aug. 25, 1992, abandoned.

[30] Foreign Application Priority Data

Aug. 27, 1991 [JP] Japan .................................. 3-215396
Sep. 11, 1991 [JP] Japan .................................. 3-231511

[51] Int. Cl.$^6$ ..................................................... G03G 21/00
[52] U.S. Cl. .......................... 355/246; 355/208; 355/214
[58] Field of Search ................................... 355/246, 214, 355/203, 204, 208, 200, 202; 358/296, 298, 300

[56] References Cited

U.S. PATENT DOCUMENTS

| | | | |
|---|---|---|---|
| 3,799,668 | 3/1974 | McVeigh | 355/203 |
| 4,256,401 | 3/1981 | Fujimura et al. | 355/214 X |
| 4,277,549 | 7/1981 | Tatsumi et al. | 355/246 |
| 4,306,804 | 12/1981 | Sakamoto et al. | 355/214 X |
| 4,348,100 | 9/1982 | Snelling | 355/246 |
| 4,693,592 | 9/1987 | Kurpan | 355/208 |
| 4,829,336 | 5/1989 | Champion et al. | 355/246 |
| 4,910,557 | 3/1990 | Imai | 355/246 |
| 4,975,747 | 12/1990 | Higuchi | 355/246 |
| 4,999,673 | 3/1991 | Bares | 355/208 |
| 5,038,175 | 8/1991 | Sohmiya et al. | 355/246 |
| 5,072,258 | 12/1991 | Harada | 355/208 |
| 5,075,725 | 12/1991 | Rushing et al. | 355/208 |
| 5,083,160 | 1/1992 | Suzuki et al. | 355/208 |
| 5,087,942 | 2/1992 | Rushing | 355/246 X |
| 5,107,302 | 4/1992 | Bisaiji | 355/246 |
| 5,122,835 | 6/1992 | Rushing et al. | 355/208 |
| 5,148,217 | 9/1992 | Almeter et al. | 355/203 |
| 5,150,155 | 9/1992 | Rushing | 355/208 |
| 5,392,097 | 2/1995 | Ohtani | 355/214 |

FOREIGN PATENT DOCUMENTS

| | | |
|---|---|---|
| 60-243649 | 12/1985 | Japan . |
| 60-243677 | 12/1985 | Japan . |
| 62-162550 | 7/1987 | Japan . |

Primary Examiner—Matthew S. Smith
Attorney, Agent, or Firm—Fitzpatrick, Cella, Harper & Scinto

[57] ABSTRACT

The present invention has an object to provide an image forming apparatus and method which enables an operator to easily adjust to the desired printing density. A paper feeding roller is driven in timing along with a registration roller. The irradiation of a modulated laser beam is started, a developing high-voltage is changed from "0" V to a predetermined voltage V1, and the voltage is changed to V2 at other timings. By sequentially changing the voltage in this manner, the printing densities from laser modulating data d1 to d10 are adjusted and printing in different densities can be performed.

44 Claims, 13 Drawing Sheets

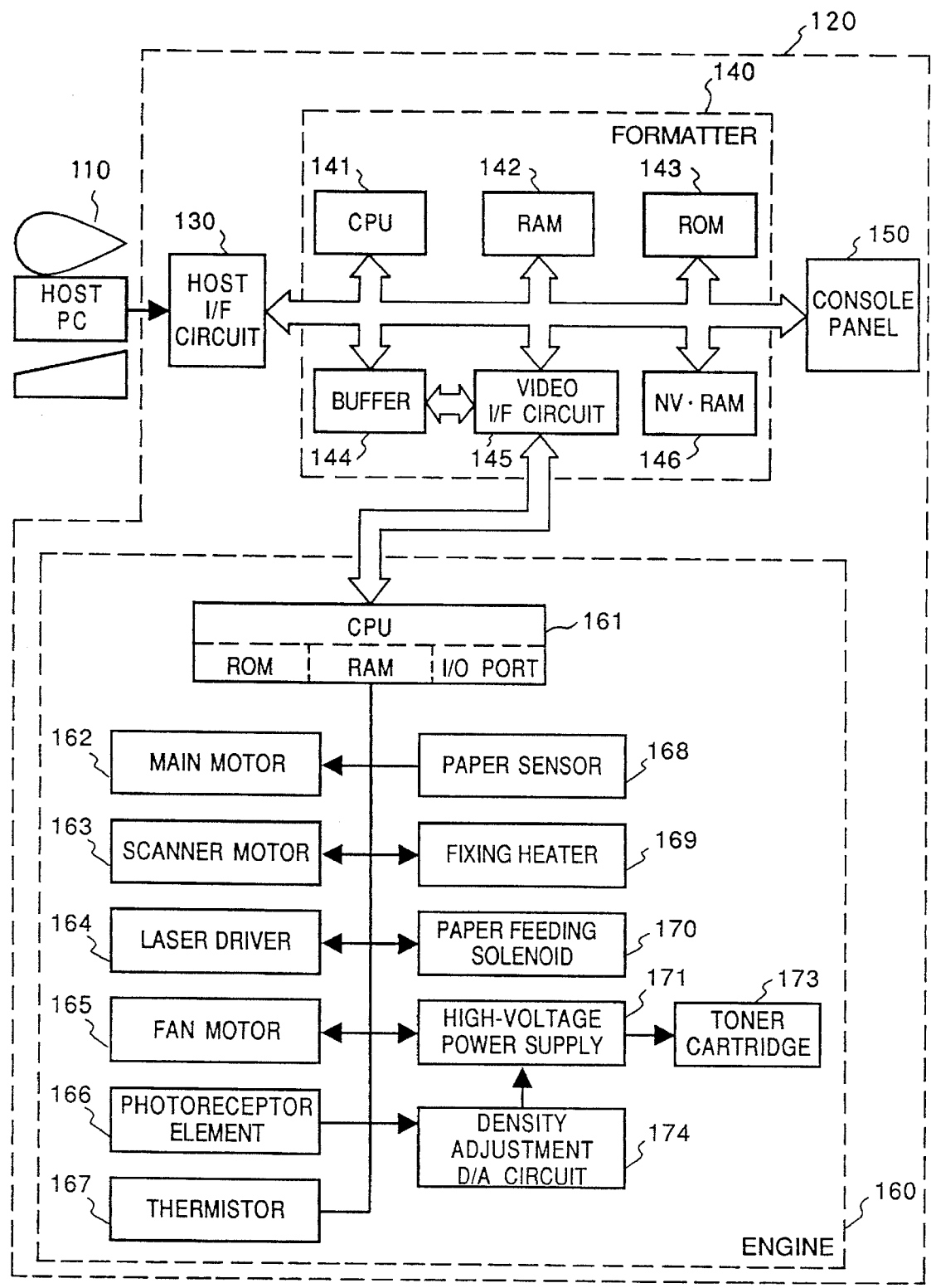
F I G. 10

GRADATION

| | 00H | 40H | 80H | C0H | FFH |
|---|---|---|---|---|---|
| density 1 | ☐ | ▨ | ▨ | ▨ | ▨ |
| density 2 | ☐ | ▨ | ▨ | ▨ | ▨ |
| density 3 | ☐ | ▨ | ▨ | ▨ | ▨ |
| density 4 | ☐ | ▨ | ▨ | ▨ | ▨ |
| ▷ density 5 | ☐ | ▨ | ▨ | ▨ | ▨ |
| density 6 | ☐ | ▨ | ▨ | ▨ | ▨ |
| density 7 | ☐ | ▨ | ▨ | ▨ | ▨ |
| density 8 | ☐ | ▨ | ▨ | ▨ | ▨ |
| density 9 | ☐ | ▨ | ▨ | ▨ | ▨ |
| density 10 | ☐ | ▨ | ▨ | ▨ | ▨ |

FIG. 14

IMAGE FORMING APPARATUS AND METHOD

This application is a continuation of application Ser. No. 08/238,352 filed May 5, 1994 which is a continuation of Ser. No. 07/934,261 filed Aug. 25, 1992, both now abandoned.

BACKGROUND OF THE INVENTION

1. Field of the Invention

Present invention relates to an image forming apparatus, and more particularly, to an image forming apparatus and method having a self test image printing function and a printing density adjustment function.

2. Related Art

In recent years, electrophotographic printers such as laser-beam printers (hereinafter, abbreviated to LBP) have been widely accepted in the market by virtue of their high-speed and high-resolution printing.

With regard to printing resolution, the resolution of a LBP widely used so far is 300 dpi (300 dots per inch). Recently, a LBP having a 600 dpi resolution has come out by request of many users for a higher resolution.

The problem is how to raise the relative precision of the size of one dot (dot diameter) among high-resolution LBP's. In a LBP, the dot diameter depends upon various parameters such as a laser-beam diameter and a laser-beam intensity (hereinafter referred to as a "laser quantity"), the sensitivity of a photoreceptor, the mechanical precision of a developing unit and the value of a developing high-voltage. The higher the resolution becomes, the more difficult it is to reduce variations of a dot diameter among LBP's.

In order to solve this problem, conventionally, a dot diameter regulating mechanism, i.e., a printing density adjustment mechanism has been employed. For example, LBP's are equipped with a rheostat to change the developing high voltage or the laser quantity by changing the resistance of the rheostat.

FIG. 1 is a block diagram showing a conventional image forming apparatus which controls the image density by a slide rheostat. In this apparatus, a voltage controlled by the slide rheostat is directly input into a high-voltage power supply circuit. The high-voltage power supply circuit controls various voltages to adjust the image density. As shown in FIG. 1, the image forming apparatus comprises a host I/F circuit which receives information from a host PC, a formatter which expands printing information from the host PC into image data, an engine, and a console panel with which an operator controls the image forming apparatus. The formatter controls the engine, which controls the electrophotographic process and prints the image information received from the formatter on a recording sheet. In the above structure, the slide rheostat is employed to change a primary charging voltage and the developing voltage of the high-voltage power supply circuit, and to change the toner density or laser quantity in developing the toner upon an electrostatic drum, controlling the printing density.

However, in the above conventional apparatus, the operator should repeat the printing operation by changing the value of the rheostat until the operator obtains a desired printing density.

Further, when old photoreceptor and developing unit are exchanged for new ones, the rheostat of the apparatus should be adjusted corresponding to the new units.

In the conventional apparatus, in order to control the image density, the voltage set by the slide rheostat is directly input into the high-voltage power supply, and the toner density and the latent image intensity are changed in accordance with the input voltage. If the slide rheostat is operated in mid-course of image formation, the image density is changed again, causing poor image condition. Accordingly, the slide rheostat is arranged in a position disabling the control during image formation, however, the user cannot easily operate the slide rheostat.

Further, in a system where a plurality of operators use a host PC, or in a system where a plurality of host PC's are connected to an image forming apparatus, it is necessary to check the value of the rheostat at each printing. If the value set in the previous printing is different from that for the current printing, the value must be set again.

SUMMARY OF THE INVENTION

The present invention has been made in consideration of the above situation, and has as its object to provide an image forming apparatus and method which enables an operator to easily adjust the output image density to the desired level.

Another object of the present invention is to provide an image forming apparatus and method capable of density adjustment during image formation. In this image forming apparatus and method, the operatability in density setting, i.e., the accessibility to the rheostat by the operator should be improved.

In order to attain the foregoing objects, an image forming apparatus according to the present invention having a test image printing function and a printing density adjustment function comprises an output means for outputting a test image and density adjustment means for adjusting the printing density of the test image to be outputted by the output means, wherein the output means outputs the test image in the printing density adjusted by the density adjustment means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a schematic block diagram showing a configuration of an image forming apparatus according to a fourth embodiment;

FIG. 14 is a diagram showing an example of test printing in a modification to the embodiments of the present invention.

DETAILED DESCRIPTION OF THE PREFERRED EMBODIMENTS

Preferred embodiments of the present invention will be described in detail in accordance with the accompanying drawings.

[First Embodiment]
<Configuration>

Figure 1:
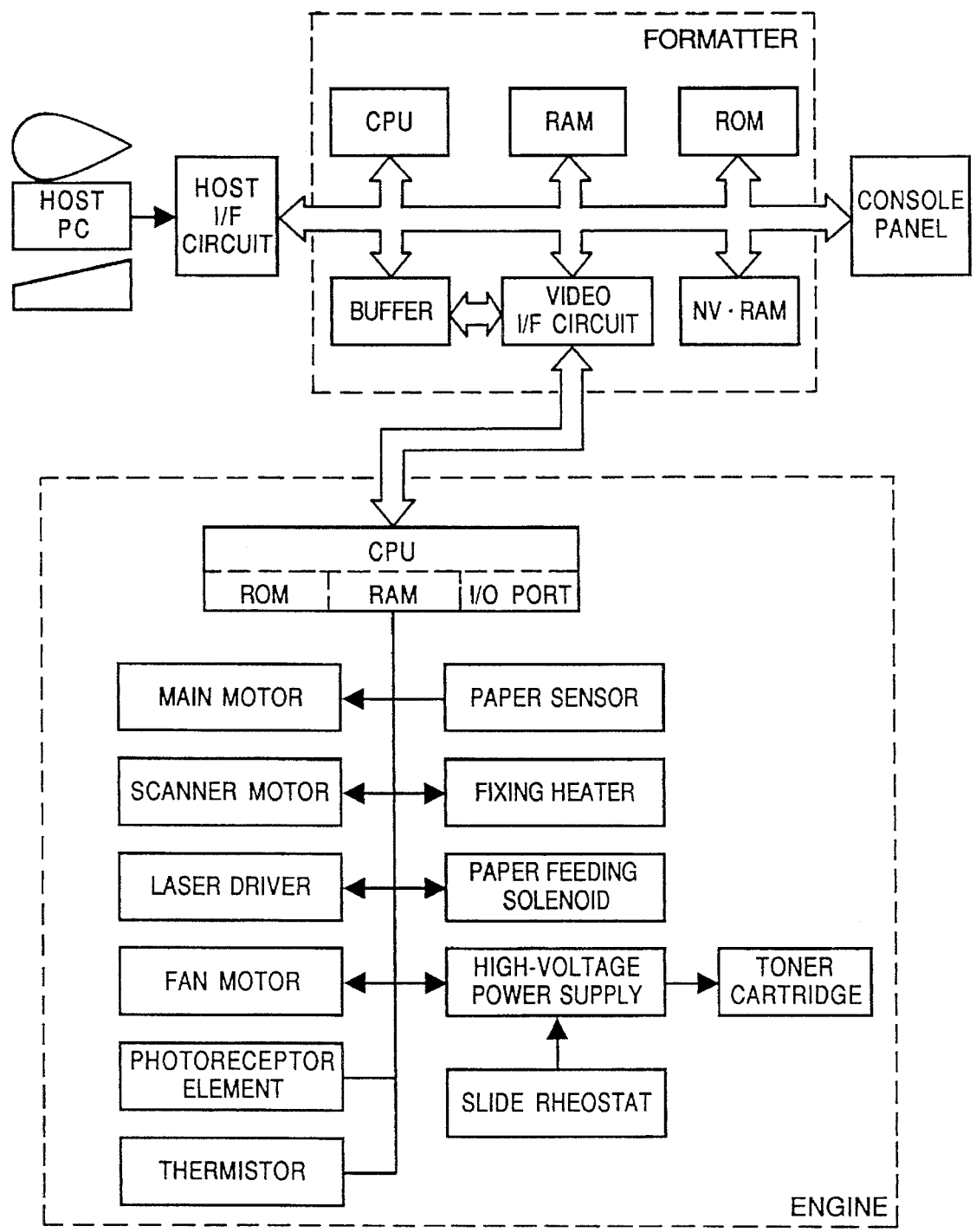
FIG. 1 is a block diagram showing a configuration of a conventional image forming apparatus.
Figure 2:
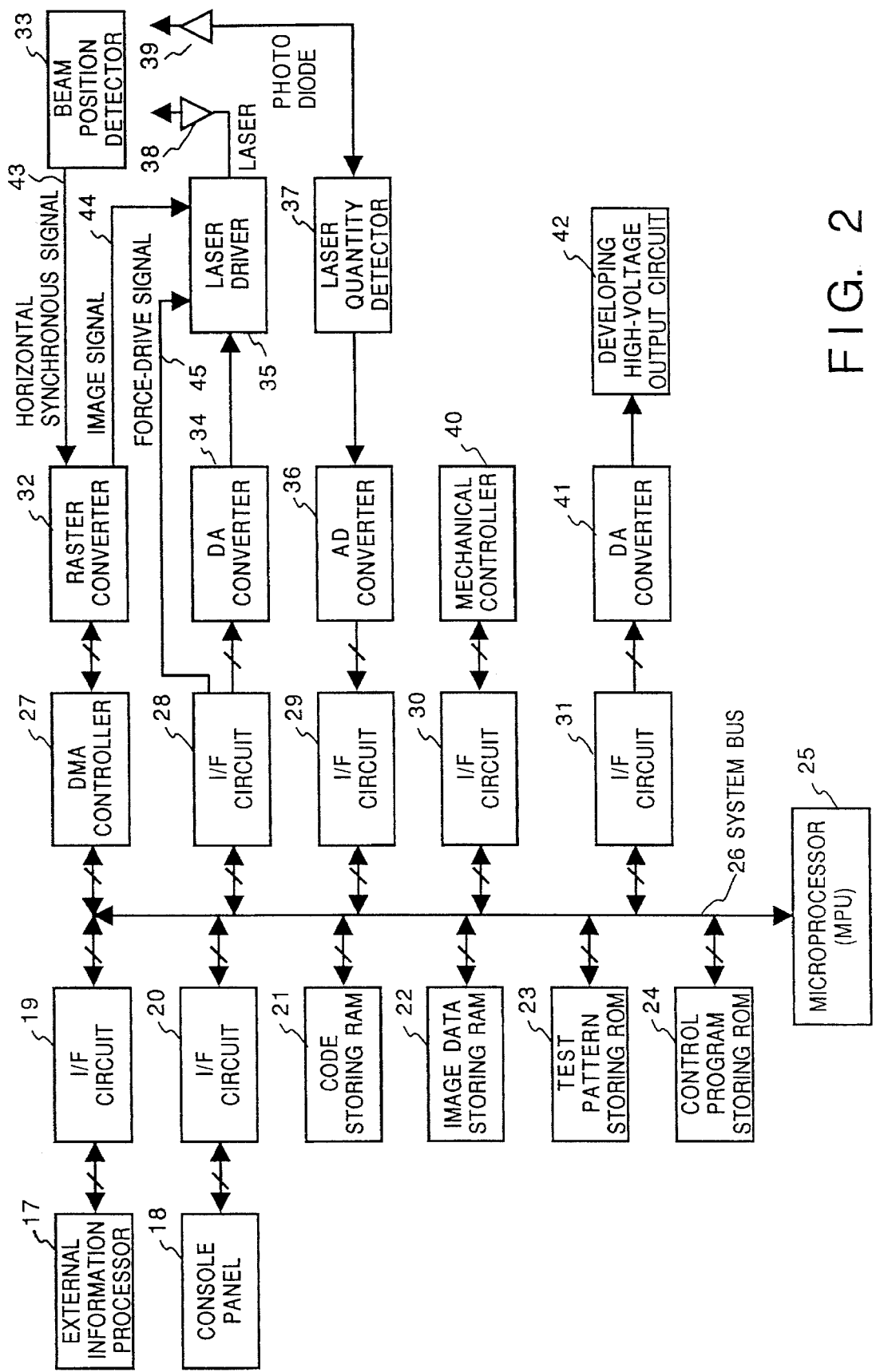
FIG. 2 is a block diagram showing a configuration of an image forming apparatus according to a first embodiment of the present invention.
Figure 3:
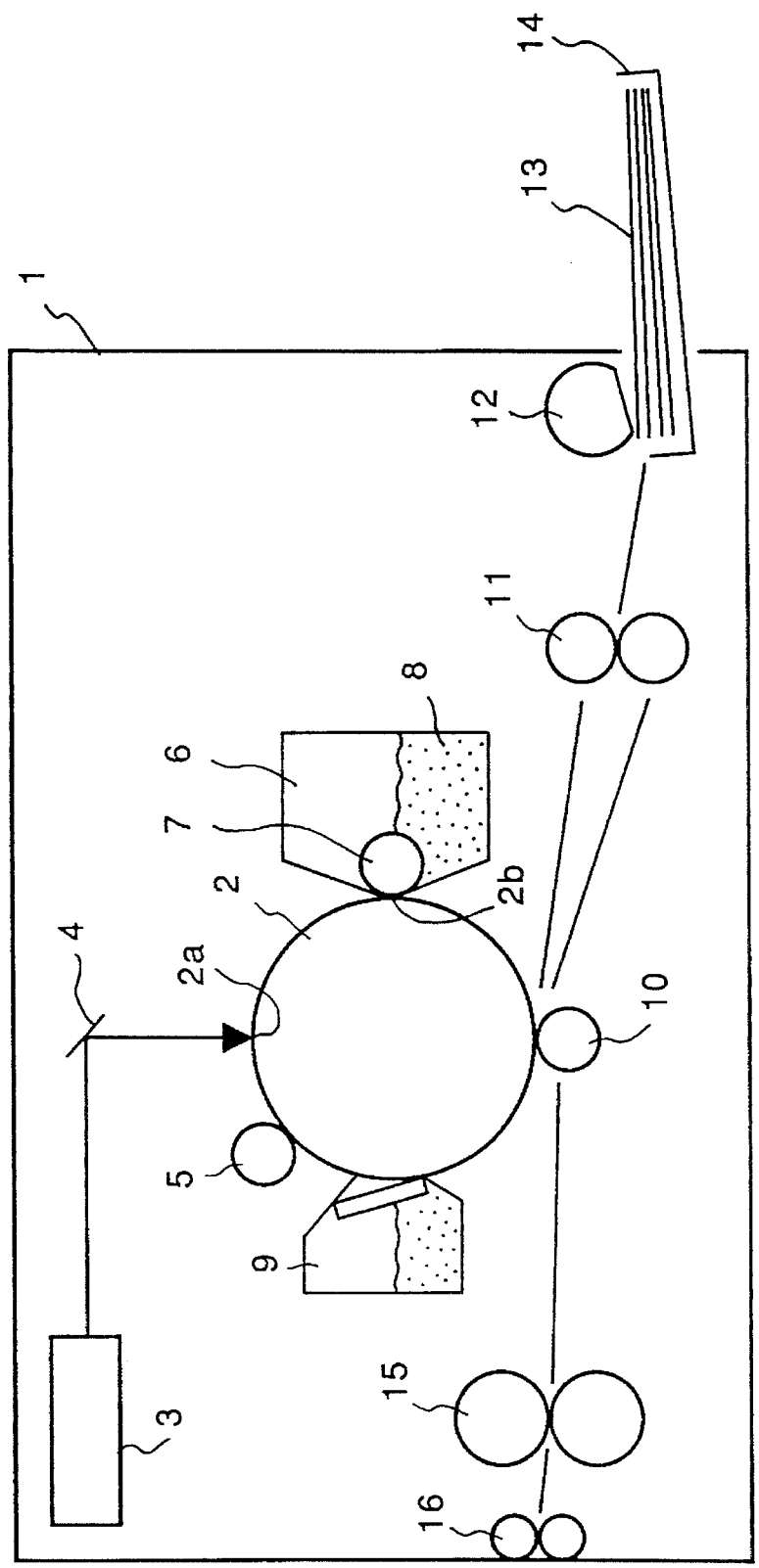
FIG. 3 is a sectional view of a printer in the first embodiment.

FIG. 2 shows the configuration of an image forming apparatus according to the first embodiment of the present invention. FIG. 3 is a mechanical sectional view of a laser-beam printer (LBP) as the printer 1 of the apparatus.

In FIG. 2, reference numeral 17 denotes an external information processor, and numeral 18 denotes a console panel having a display and an input keyboard. Interface circuits 19, 20, 28, 29, 30 and 31 include input-output buffers and latch circuits. A mechanical controller 40 controls the driving motor (not shown) for an electrostatic drum (FIG. 3). A microprocessor (hereinafter referred to as "MPU") 25 controls all sequences and image processing of the LBP. A code storing RAM 21 stores code information received from the external information processor 17. An image data storing RAM 22 stores image data expanded based upon the code information. A test pattern storing ROM 23 stores test patterns. A control program storing ROM 24 stores the operating sequences in the LBP, character information and figure information. Numeral 26 is a system bus which includes an address bus, a data bus, a controller bus and the like.

When code information is received from the external information processor 17 via the I/F circuit 19, the MPU 25 stores the code information into the code storing RAM 21. The MPU 25 expands the data in the RAM 21 into binary data in bit-map form in accordance with a program in the control program storing ROM 24, and stores the binary image data into the image data storing RAM 22. After code information for one page have been received and expanded into image data for one page, the MPU 25 starts a DMA controller 27, which reads the image data stored in the RAM 22 sequentially out of a predetermined address at the request of a raster converter 32. The DMA controller 27 transfers the image data to the raster converter 32, which converts the received data into a serialized image signal 44 and outputs a request signal to the DMA controller 27 synchronizing with a horizontal synchronous signal 43 received from a beam position detector 33. Thus, the code information sent from the external information processor 17 is converted into a serialized image signal. This process is referred to as an "online mode".

On the other hand, the apparatus has an "offline test mode" in which data communication with the external information processor 17 is stopped and test image data are formed. The apparatus is set to the offline test mode by an instruction from the console panel 18, and various tests are performed. In this mode, the MPU 25 forms bit-map image data in the image data storing RAM 22 in accordance with test image information stored in the test pattern storing ROM 23. Similarly to the online mode, the MPU 25 starts the DMA controller 27 and the raster converter 32 to convert the test image information into a serial image signal.

Figure 4:
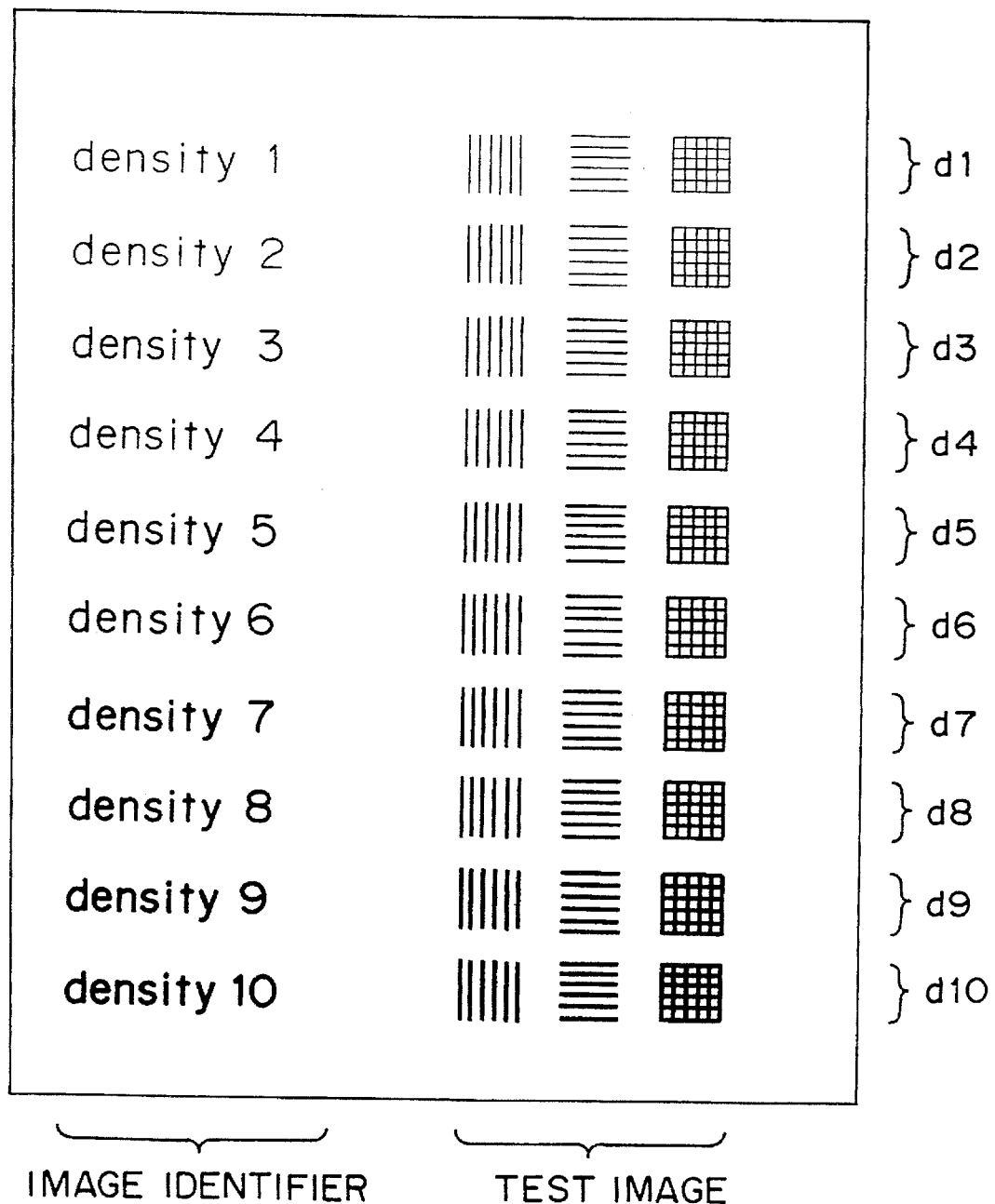
FIG. 4 illustrates a test image in the first embodiment.

The test image data formed in a bit map memory of the image data storing RAM 22 are as shown in FIG. 4, where a pattern is repeated. One test pattern is composed of blocks of vertical lines, horizontal lines and a combination of both. Alternatively, the test pattern may be a gray scale pattern. Image identifiers representing different densities are formed corresponding to the test patterns identified as density 1, density 2, . . . density 10.

<Printing Operation>

Next, the printing operation of the test image data shown in FIG. 4 will be described with reference to FIGS. 2 and 3.

As described above, when code data for one page are expanded into image data, the MPU 25 starts to rotate a laser scanner 3 and an electrostatic drum 2. The laser scanner 3 includes a semiconductor laser unit and a polygon mirror. After the revolution of the laser scanner 3 has reached a predetermined value, the MPU 25 starts a laser driver 35 via the I/F circuit 28. At this time, the output of a DA converter 34 becomes the minimum value, and a force-drive signal 45 becomes active. By this operation, the laser driver 35 forcibly activates a laser 38 to emit a small amount of laser beam. A laser beam emitted from the laser 38 is irradiated into the laser scanner 3 and a part of the beam is directly irradiated into a photo diode 39, where the light is photo-electrically converted into a current proportional to the light quantity. The current from the photo diode 39 is converted into an analog voltage by a laser quantity detector 37, and the analog voltage is further converted into digital data by an AD converter 36. The MPU 25 receives the digital data via the I/F circuit 29. Thus the MPU 25 can recognize the detected the laser quantity. Further, the MPU 25 gradually increases the laser quantity by controlling the laser driver 35 via the I/F circuit 28 and the DA converter 34 while monitoring the laser quantity until the quantity reaches a predetermined value, and maintains the quantity.

The laser beam swept back and forth along a main scanning direction by the laser scanner 3 is projected upon a reflecting mirror 4 and at the same time upon the beam position detector 33. Every time the laser beam is impinged upon the beam position detector 33, the beam position detector 33 outputs a pulse signal to the raster converter 32 as the horizontal synchronous signal 43. The raster converter 32, synchronizing to the signal 43, requires the DMA controller 27 to output data and converts the data received from the DMA controller 27 into serial raster data. The raster converter 32 outputs the raster data as the image signal 44 to the laser driver 35. The image data stored in the image data storing RAM 22 are converted into a rastered laser beam having a fixed peak value.

The modulated laser beam, swept back and forth in the main scanning direction by the laser scanner 3 and reflected by the reflecting mirror 4, scans the surface of the electrostatic drum 2. The surface of the electrostatic drum 2 is electrically charged by a primary charging roller 5. A latent image is formed on the charged surface of the drum 2 by the scanning of the laser beam. The latent image is converted into a toner image by a developing unit 6 which includes a toner 8 and a developing roller 7. The developing roller 7 is a cylindrical magnet which carries the toner 8 attached to its surface by applying a high-voltage onto the surface of the drum 2. The toner image formed in this manner is further carried to a transfer roller 10.

After image data for one page have been formed and the laser scanner 3 and the electrostatic drum 2 have been started to rotate, a paper feeding roller 12 conveys a sheet 13 from a paper cassette 14 to registration rollers 11, so that the sheet 13 abuts against the registration rollers 11. The registration rollers 11 start to rotate after a predetermined period of time, to convey the sheet 13 to the transfer roller 10. Next, the toner image formed by the developing roller 7 is transferred on the sheet 13 by the transfer roller 10. The sheet 13 to which the toner image is transferred is conveyed through fixing rollers 15 which fix the toner on the sheet 13. The sheet 13 is conveyed through paper discharging rollers 16 and is delivered to the outside.

The toner on the electrostatic drum 2 which has not been transferred by the transfer roller 10 is gathered by a cleaner 9.

<First Control Method>

The test image data as shown in FIG. 4 are printed in the above-described manner. In this embodiment, the high-voltage supplied to the developing roller 7 is changed in the following method which will be described with reference to a timing chart of FIG. 5.

Figure 5:
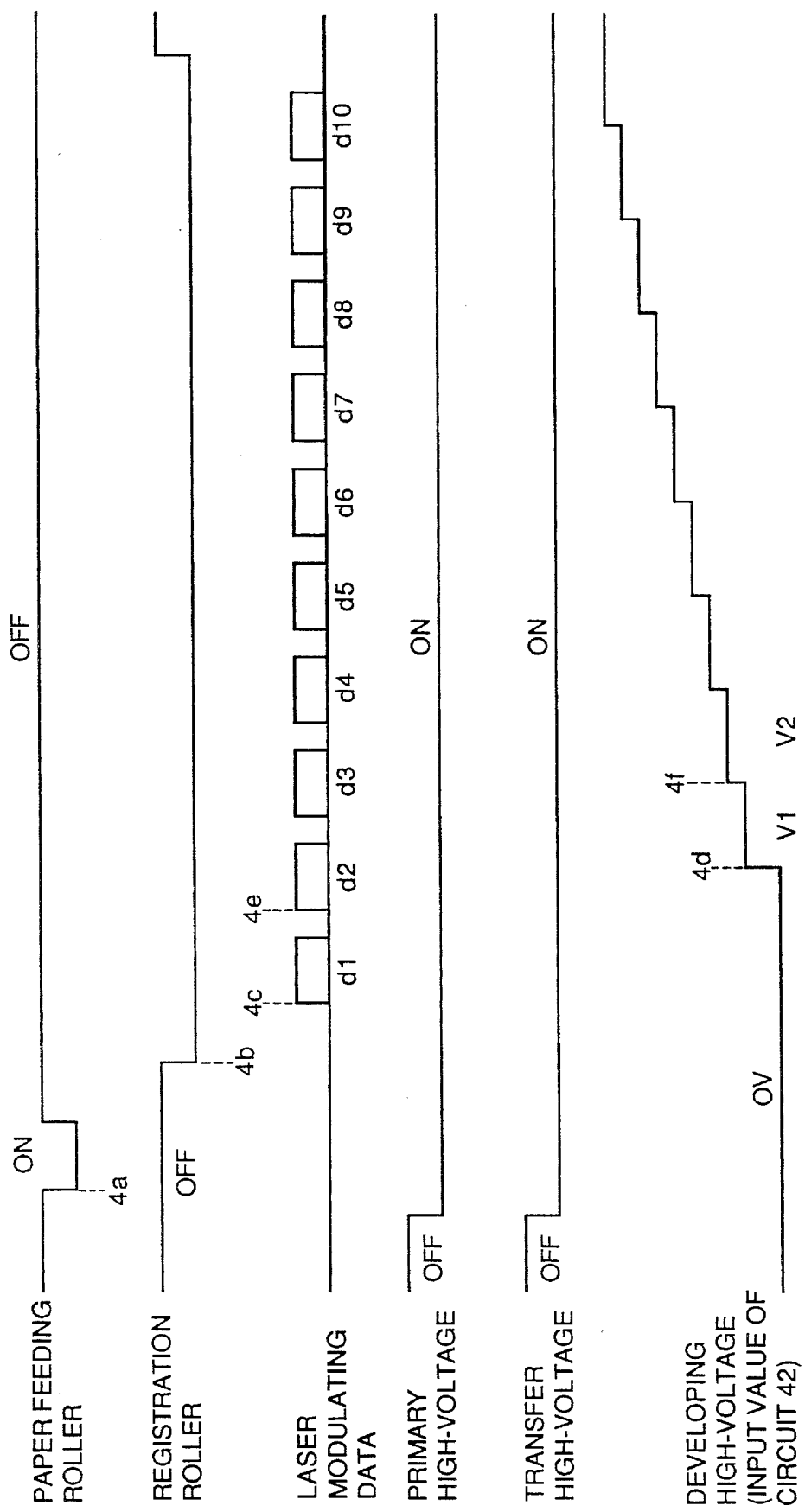
FIG. 5 is a timing chart showing density adjustment in the first control method in the first embodiment.

First, the paper feeding roller 12 is driven at timing 4a, and the registration rollers 11 are driven at timing 4b. In FIG. 5, reference numerals d1 to d10 denote data respectively corresponding to densities d1 to d10 respectively as shown in FIG. 4. The test images and corresponding identification images are sequentially output during timing d1 to d10.

In this control method, a developing high-voltage is varied from "0" to a predetermined voltage V1 at timing 4d by changing data input into a DA converter 41 via the I/F circuit 31. The DA converter 41 converts the data received from the I/F circuit 31 into an analog voltage and outputs the voltage into a developing high-voltage output circuit 42. The developing high-voltage output circuit 42 outputs a high-voltage equivalent to the input analog voltage to the developing roller 7. The MPU 25 changes the developing high-voltage by changing data input into the I/F circuit 31.

In FIG. 5, the period from 4b to 4c approximately coincides with the period during which the electrostatic drum 2 rotates from a point 2a to a point 2b. After the developing high-voltage is made V1 at timing 4d, the voltage is raised to V2 at timing 4f. The period from 4d to 4f corresponds to the period from 4c to 4e.

In this manner, the test image of d1 is developed at the developing high-voltage V1 and the test image of d2 is developed at the voltage V2. The higher the developing voltage rises, the higher the printing density becomes. Thus the test images are printed in different printing densities. Note that in this control method, the printing density is raised in the ascending order from d1 to d10.

In the control method as described above, the same test pattern to which an image identifier is added can be printed in different densities.

The apparatus of this embodiment can be set to various modes by key switches on the console panel 18. For example, in the "offline" status, an operator can set a "density setting mode" by manually operating a corresponding key switch. In the "density setting mode", the operator can select a density from the densities d1 to d10 as described above. The status set by the operator and the corresponding input data from the DA converter 41 are stored in the code storing RAM 21.

In the "online" status, when the apparatus receives image data for one page from the external information processor 17, it starts the printing operation. The difference between the printing operation in the "online" status and that in the "offline" status lies in the control method of the developing high-voltage. In the "online" status, the apparatus controls the printing density to be uniform for the whole page by maintaining the voltage input into the developing high-voltage output circuit 42 to a predetermined value. The MPU 25 inputs a density setting value stored in the code storing RAM 21 in advance into the DA converter 41. By this operation, data from the external information processor 17 can be printed in the density set by the operator.

The embodiment is an example where the present invention is applied to a laser-beam printer. However, the present invention is applicable to a LED printer and a LCD printer as well as a laser-beam printer by replacing the laser driver 35 and the laser scanner 3 with a LED array head and a LCD head.

<Second Control Method>

In the first control method, the density control is made by changing a developing high-voltage, however, it can also be made by changing the laser quantity.

In a second control method, the laser driver 35 drives the laser 38 to emit a laser beam using the I/F circuit 28 and the DA converter 34. The laser quantity is detected by the laser quantity detector 37 through the photo diode 39, the AD converter 36 and the I/F circuit 29 for controlling a laser driving current value of the laser 38 to a predetermined value. Note that the driving current value for obtaining a predetermined amount of the laser light is stored in the code storing RAM 21 in advance. More specifically, data corresponding to an AD output value from the AD converter 36 to be inputted into the DA converter 34 are detected and stored as a table into the code storing RAM 21 in advance. The MPU 25 gradually changes data to be inputted into the DA converter 34 in accordance with the data in the table, performing the density adjustment.

Figure 6:
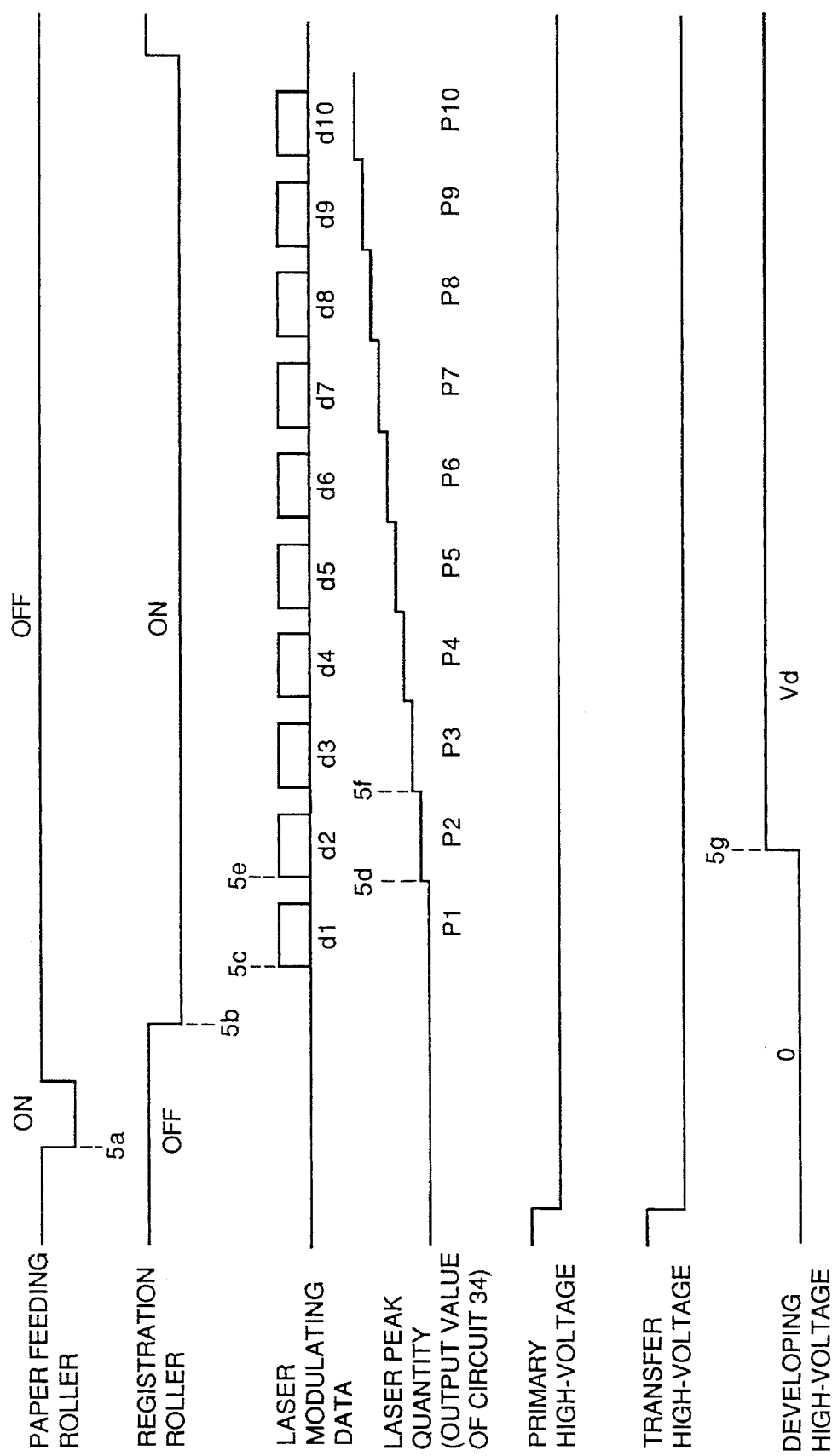
FIG. 6 is a timing chart showing density adjustment in the second control method in the first embodiment.

FIG. 6 is a timing chart of changing the laser quantity and printing of a test image. In FIG. 6, the paper feeding roller 12 is driven at timing 5a, and the registration roller 11 is driven at timing 5b. In timing 5c, the laser modulated with the test pattern d1 is outputted. At this time, the MPU 25 outputs data into the DA converter 34 in accordance with the table stored in the code storing RAM 21 so that the peak value of the laser quantity becomes p1. Next, the MPU 25 makes the peak amount of the laser 38 p2 at timing 5d, then outputs the laser beam modulated with the test pattern of d2. In the manner as described above, the test patterns of d1 to d10 can be output with different peak amounts, i.e., can be printed in different densities. Note that the developing high-voltage rises from "0" to Vd at timing 5g, and that the test patterns d1 to d10 are printed with the same developing high-voltage.

According to the second control method, the same test pattern can be printed in different printing densities in the "offline" test printing mode. Note that in the "online mode", the information received from the external information processor 17 is printed in a density designated from the console panel 18, similarly to the first control method.

As described above, according to the first embodiment, various printing densities can be discriminated by repeatedly printing the same test pattern in different densities. Further, the image information from the external information processor can be printed in a desired density by adding image identifiers to the different test patterns so that a density corresponding to the image identifier can be selected.

The present invention can be applied to a LED printer using a LED array head to change the peak light amount of the LED array as well as a LBP. Also, the present invention can be applied to a LCD printer by changing the luminous amount of a fluorescent tube.

As described above, according to the first embodiment, the operator can easily adjust the density of an output image.

[Second Embodiment]

Figure 7:
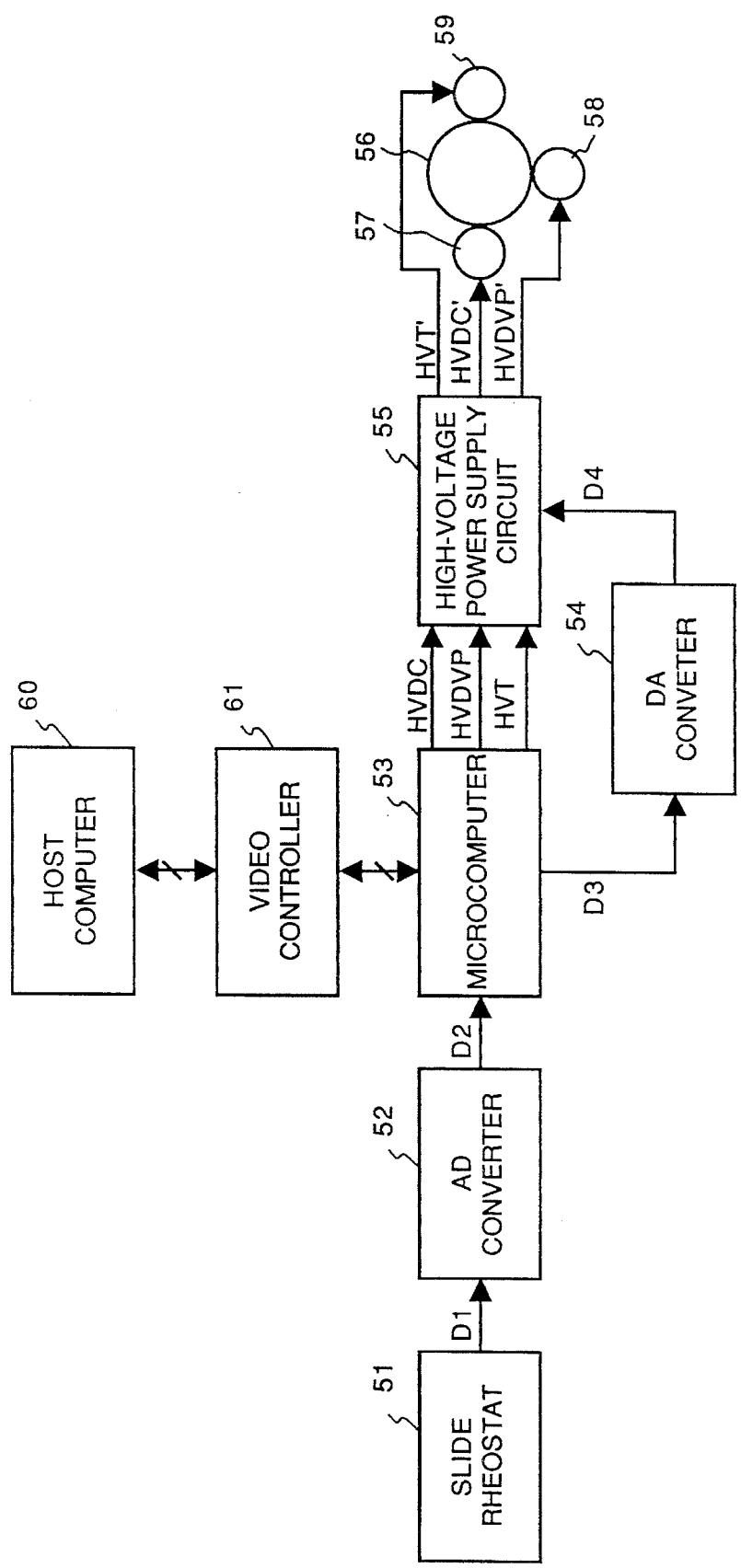
FIG. 7 is a schematic block diagram showing a configuration of an image forming apparatus according to a second embodiment of the present invention.

FIG. 7 is a schematic block diagram showing the configuration of the image forming apparatus according to a second embodiment of the present invention. In FIG. 7, reference numeral 51 denotes a slide rheostat for setting an image density, and 52, an AD converter. The AD converter 52 converts current D1 controlled by the slide rheostat 51 into digital data D2 and outputs the digital data D2 to a microcomputer 53 which controls various operations in the laser-beam printer. A DA converter 54 converts digital data D3 output from the microcomputer 53 into an analog voltage D4. A high-voltage power supply circuit 55 generates a primary charging voltage HVDC', a developing bias voltage HVDVP' and a transfer voltage HVT', and controls an image density. Numeral 56 denotes an electrostatic drum, and 57, a primary charging roller. Numeral 58 denotes a developing cylinder, and 59, a transfer charging roller. A host computer 60 transmits code information. A video controller 61 expands the code information from the host computer 60 into printable image information.

In the above structure, when the microcomputer 53 is in a status capable of image forming, the microcomputer 53 turns a ready (RDY) signal on toward the video controller 61. When the video controller 61 recognizes the signal RDY, it outputs a signal instructing the start of image forming (hereinafter print (PRNT) signal) to the microcomputer 53. The microcomputer 53 recognizes the signal PRNT and turns a main motor driving signal (PMDRV) on for driving the main motor (not shown).

Next, when the main motor starts, the electrostatic drum 56, the primary charging roller 57, the developing cylinder 58 and the transfer charging roller 59 respectively start interlocking with the motion of the main motor. Thereafter, the microcomputer 53 turns a primary charging signal on and charges the primary charging roller 57 with the primary charging voltage HVDC' so that the surface of the electrostatic drum 56 is uniformly charged. Upon this charged surface of the electrostatic drum 56, a laser beam modulated in accordance with an image signal VDO is irradiated to form a latent image. The latent image formed on the surface of the electrostatic drum 56 is transferred onto a printing sheet by the transfer charging roller 59 after a visible image is formed by toner on the developing cylinder 58.

Figure 8:
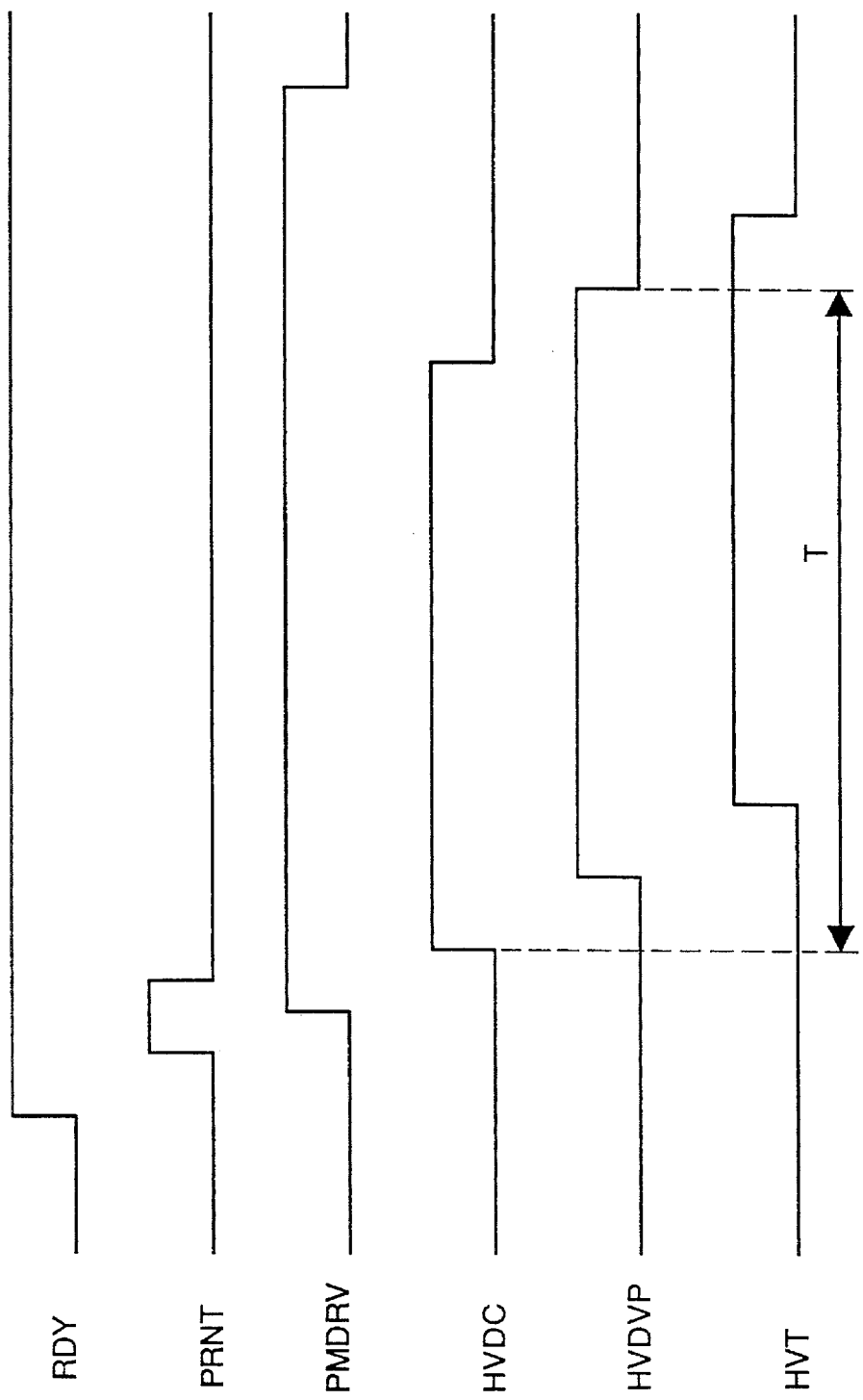
FIG. 8 is a timing chart showing an image forming period in the second embodiment.

In the above-described image forming process, signals controlling the output timings of the primary charging voltage HVDC', the developing bias voltage HVDVP' and the transfer voltage HVT' generated by the high-voltage power supply circuit 55 are a primary high-voltage driving signal HDVC, a developing bias driving signal HVDVP and a transfer high-voltage control signal HVT. These signals are outputted from the microcomputer 53 in timings as shown in FIG. 8.

When the AD converter 52 receives the intermediate tap voltage D1 from the slide rheostat 51, it converts the tap voltage D1 into the digital data D2 and inputs the data into the microcomputer 53. The microcomputer 53 outputs the digital data D3 corresponding to the input digital data D2 to the DA converter 54. The DA converter 54 converts the digital data D3 into the analog data D4 and inputs the data D4 into the high-voltage power supply circuit 55. The high-voltage power supply circuit 55 performs the image density control in accordance with the input analog data D4. More specifically, as the image density can be controlled by changing the charging amount to the surface potential of the electrostatic drum 56 and the toner, i.e., by changing the potential difference between the surface potential of the drum 56 and the potential of the developing cylinder 58, the high-voltage power supply circuit 55 changes the potential difference between the primary charging voltage and the developing voltage in accordance with the input analog data D4 to control the image density.

Accordingly, if the image density is changed while the electrostatic drum 56 and the developing cylinder 58 are charged with the primary charging voltage and the developing voltage ("T" in FIG. 8), the potential difference between the primary charging voltage and the developing voltage changes non-linearly, causing a poor image condition. In order to prevent such condition, the potential difference between the primary charging voltage and the developing voltage should be fixed during the above charging period.

For the above reason, the microcomputer 53 outputs the primary high-voltage driving signal HVDC and the developing bias driving signal HVDVP, respectively for controlling the output timings of the primary charging voltage HVDC' and the developing voltage HVDVP'. The microcomputer 53 controls the timing for changing the potential difference between the primary charging voltage and the developing voltage by controlling the output timing of the digital data D3 to the DA converter 54.

The image forming is performed during a period when the electrostatic drum 56 and the developing cylinder 58 are charged with the primary charging voltage and the developing voltage, i.e., while either the primary high-voltage driving signal or the developing bias driving signal, both from the microcomputer 53, is on. In this period, though the slide rheostat 51 is operated to change the digital data D2 in the microcomputer 53, the microcomputer 53 maintains the value of the digital data D3 to be outputted to the DA converter 54, and after the image forming period, the microcomputer 53 changes the output digital data D3 in accordance with the input digital data D2, preventing the poor image condition.

By this operation, the slide rheostat 51 can be operated even during the image forming period. Also, the slide rheostat 51 can be arranged in a position where the user can easily operate it.

[Third Embodiment]

Next, a third embodiment according to the present invention will be described with reference to FIG. 9.

In this embodiment, the interface for the microcomputer 53 and the video controller 61 shown in FIG. 7 is a video interface, through which the microcomputer 53 and the video controller 61 perform serial communication. In this serial communication, the video controller 61 provides 8-bit control information as a command to the microcomputer 53, while the microcomputer 53 provides also 8-bit status information as a status to the video controller 61. The video controller 61 is connected to the host computer 60 via a host interface. The microcomputer 53 receives image density control information from the host computer 60 via the host interface and the video interface.

In the above-described structure, a setting means for setting an image density can be arranged on the host computer 60 side.

Figure 9:
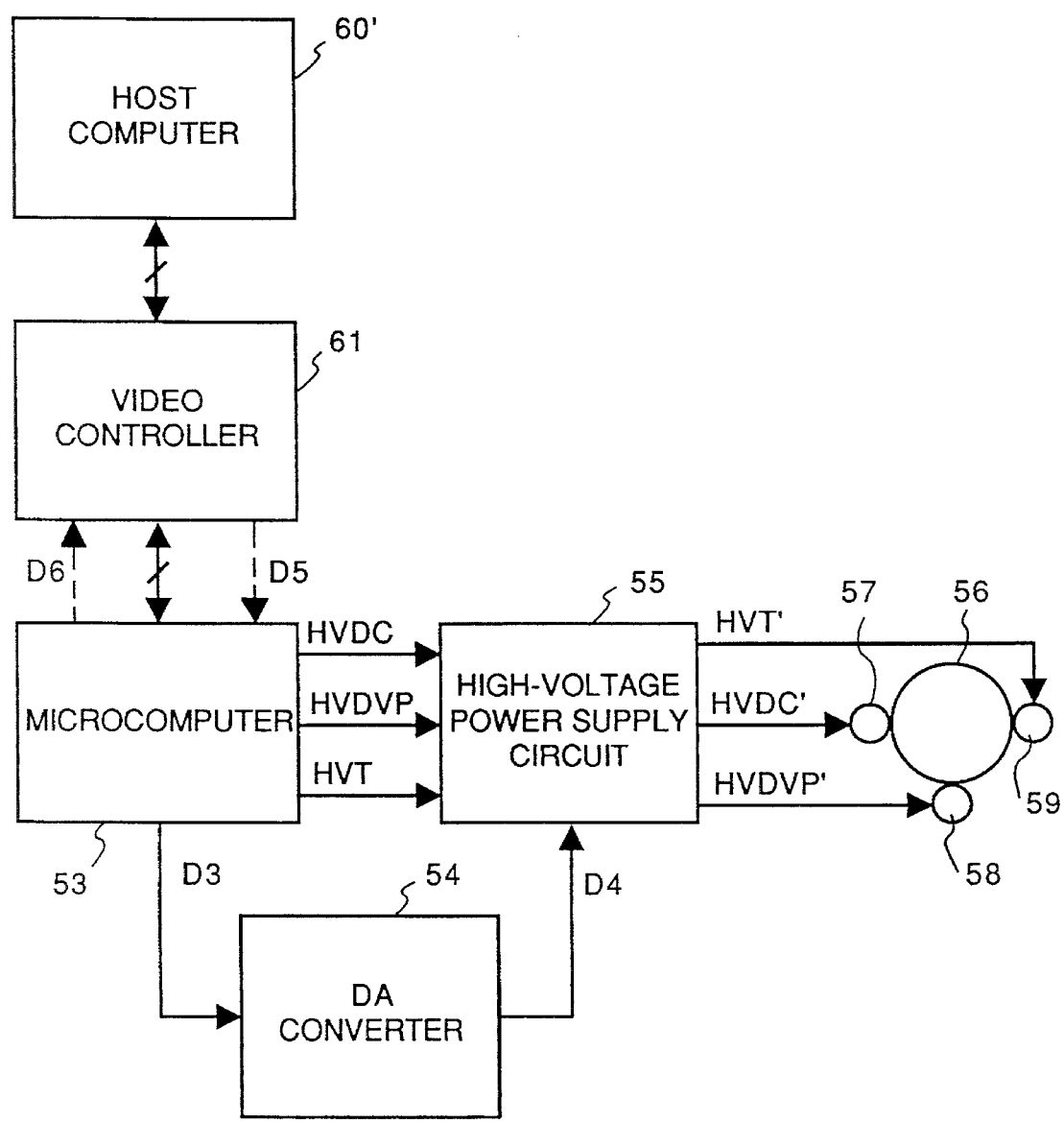
FIG. 9 is a schematic block diagram showing a configuration of an image forming apparatus according to a third embodiment.

FIG. 9 is a schematic block diagram showing the configuration of an image forming apparatus according to the third embodiment. In FIG. 9, the same reference numerals as those in FIG. 7 denote the corresponding elements and therefore the explanations of these numerals will be omitted. In FIG. 9, a host computer 60' has an image density operating means corresponding to the slide rheostat 51 in FIG. 7.

When the operator instructs an image density through the image density operating means of the host computer 60', image density control information corresponding to the operation is outputted from the host computer 60' via the host interface to the video controller 61, which outputs an image density control command according to the image density control information to the microcomputer 53 via the video interface. The microcomputer 53 controls the output digital data D3 in accordance with the image density control command. Thereafter, the image density can be adjusted by the similar processing to the second embodiment.

Again the aforementioned poor image condition should be considered in this image density control, since the image density operating means can be manipulated at an arbitrary time regardless of the status of the apparatus. In order to prevent such condition, the third embodiment is arranged as follows. Even when the microcomputer 53 receives an image density control command during image formation, the microcomputer 53 does not execute the command and it holds the command and the digital data D3 to be outputted to the DA converter 54. After the image forming period, the microcomputer 53 changes the digital data D3 in accordance with the command data.

In this embodiment, the image density operating means is arranged in the host computer 60'. However, usually a console panel (not shown) is connected to the video controller 61, the console panel can be employed as the image density operating means.

[Fourth Embodiment]

Next, a fourth embodiment according to the present invention will be described with reference to FIG. 10.

FIG. 10 is a schematic block diagram showing the configuration of an image forming apparatus in the fourth embodiment. An image forming apparatus 120 is constituted by a host I/F circuit 130 which receives printing information from a host PC 110, a formatter 140 for expanding image information in accordance with the printing information, a console panel 150 for setting an image density and an engine 160 which performs printing by an electrophotographic processing.

The formatter 140 includes a CPU 141, a RAM 142, a ROM 143, a buffer 144, a video I/F circuit 145 and a nonvolatile (NV) RAM 146. The engine 160 comprises a one-chip microcomputer 161 incorporating a CPU, a ROM, a RAM, an I/O port and the like. The engine 160 further comprises a main motor 162, a scanner motor 163, a laser driver 164, a fan motor 165, a photoreceptor element 166, a thermistor 167, a paper sensor 168, a fixing heater 169, a paper feeding solenoid 170, a high-voltage power supply 171, a density adjustment D/A circuit 174 and a toner cartridge 173 and the like.

When printing information including information such as sheet size designation information and density setting information is inputted into the formatter 140 via the host I/F circuit 130, the CPU 141, in accordance with an image expanding program stored in the ROM 143, discriminates the printing information, expands image information and stores the image information into the buffer 144. After the expanding processing, the CPU 141 issues a printing start command to the CPU 161 in the engine 160 via the video I/F circuit 145. On the other hand, the CPU 161 starts the respective parts in the engine 160, feeds a recording sheet, and notifies the formatter 140 that the engine 160 is in a printing status. On the formatter 140 side, the image information is read out of the buffer 144 in a horizontal synchronous timing and a laser is flickered to start the printing by the electrophotographic printing processing.

At this time, an initial value of the density setting information written in the ROM 143 in the formatter 140 is set in the NV-RAM 146, otherwise the operator designates a desired density by the manual operation of the console panel 150. On the other hand, when density setting information from the host PC 110 is inputted, the value is written into the RAM 142. The value is employed for density adjustment and is cleared after the printing. If density setting information is not input from the host PC 110, the value set in the above-described NV-RAM 146 is employed for the density adjustment. More specifically, the CPU 141 determines whether density setting information is inputted from the host PC 110. If the information is inputted, the CPU 141 transmits the density setting information to the engine 160 via the video I/F circuit 145. The CPU 161 in the engine 160 sets the setting information in the density adjustment D/A circuit 174. The primary charging voltage and the developing voltage in the high-voltage power supply 171 respectively change based upon the set value, thus the density is adjusted.

Figure 11:
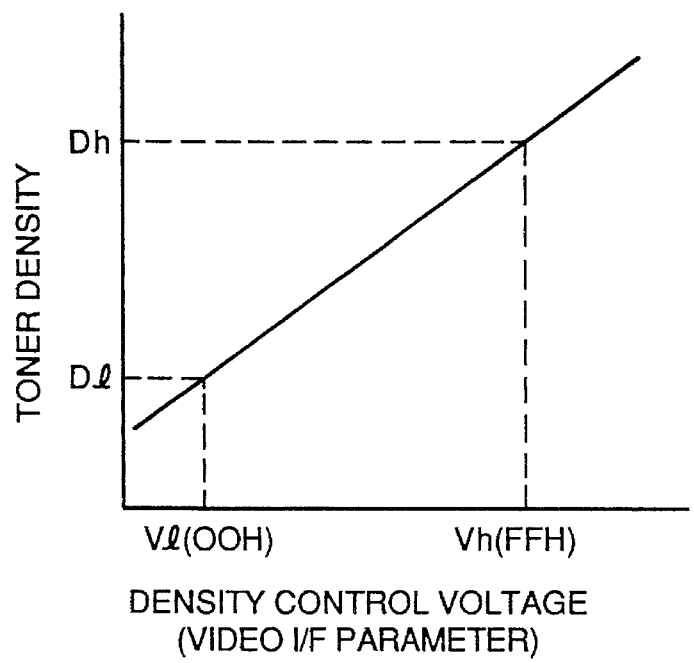
FIGS. 11 and 12 respectively show the relationship between a density control voltage and a toner density characteristic.

The above-described density setting information is realized by plural byte packet (array), where the first half bytes pattern indicates a command and the latter half bytes pattern does a density setting value. The CPU 141 discriminates the byte patterns and recognizes the density setting command. The CPU 141 sends the density setting value to the CPU 161 via the video I/F circuit 145. The CPU 161 controls the density adjustment D/A circuit 174 with the density setting value, and thus controls a toner density as shown in FIG. 11. FIG. 11 illustrates the relationship between the toner density and the primary charging voltage and the developing voltage. As shown in FIG. 11, the density adjustment D/A circuit 174 is set so that the toner density value becomes Dh at the maximum density setting value (FFH) Vh and Dl at the minimum value (00H) Vl.

Figure 12:
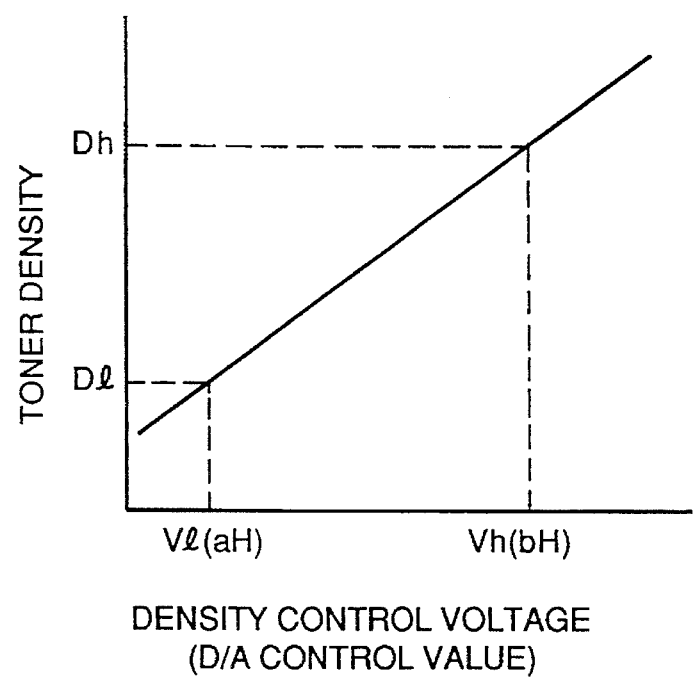

On the other hand, if a density setting command is not input, the CPU 141 reads out the value in the NV-RAM 146 as a default value. In this case, the density setting value is calculated and set so that it reaches the object values in accordance with the density control voltage and the toner density, the characteristics of which are as shown in FIG. 12. Note that unless the user sets another density, the printing is performed in the same density.

As described above, if a series of printing information having density setting information is sent from the host PC 110, the density setting value is effective only for the printing of the printing information. If no density setting information comes in the next printing, the printing is performed in the density based on a default value.

[Fifth Embodiment]

Next, a fifth embodiment according to the present invention will be described with reference to FIG. 13.

Figure 13:
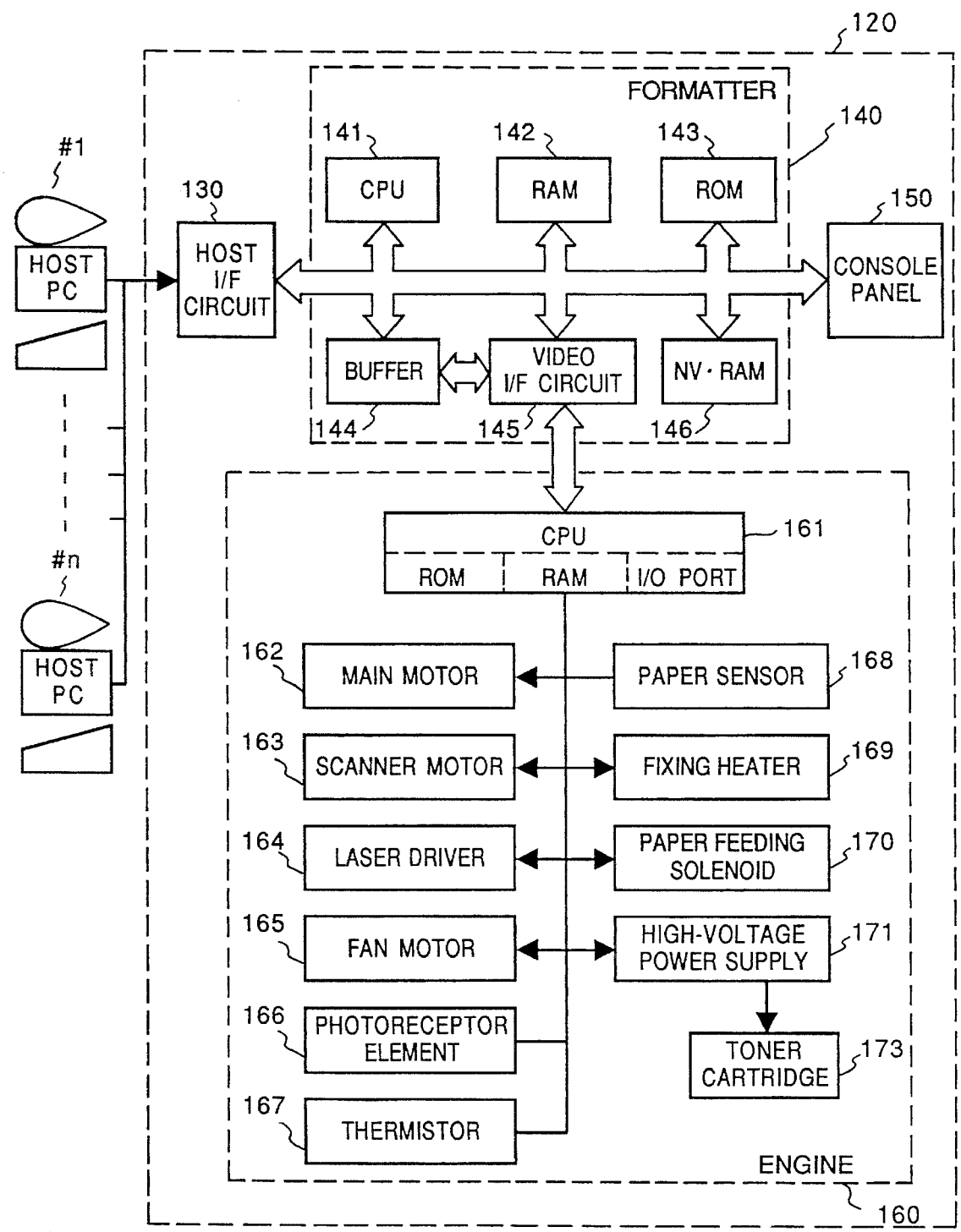
FIG. 13 is a schematic block diagram showing a configuration of an image forming apparatus according to a fifth embodiment.

FIG. 13 is a schematic block diagram showing the configuration of an image forming apparatus according to the fifth embodiment. As shown in FIG. 13, the apparatus is connected to a plurality of host PC's. The structure of the apparatus is similar to that in the fourth embodiment shown in FIG. 10. In this structure, density setting information set by, e.g., the host PC #1 is applicable only to the host PC #1, not to the other host PC's. That is, the CPU 141 of the formatter 140 discriminates the identification code of a host PC and density setting information set by the host PC, and controls the development voltage to change the toner density in the printing. Similarly to the fourth embodiment, density setting information is set in the NV-RAM 146 in advance. If the next printing information from the same host PC does not include density setting information, the density setting value in the NV-RAM 146 is read out for the toner density adjustment.

In the case where the image forming apparatus is connected to a plurality of host PC's, printing based on a toner density set by one PC can be carried out without influencing the other host PC's by discriminating the identification code of the host PC and the density setting information and by controlling the toner density. Further, if the identification code and the toner density information cannot be discriminated, by setting the toner density to the default value at every printing, the printing can be performed without influencing the other host PC's with a density set in a previous printing.

In the embodiments, the toner density is changed by controlling the primary charging voltage and a developing voltage. However, the toner density can also be changed by directly controlling a latent image on the electrostatic drum. In this case, the density adjustment D/A circuit 174 controls variations in a laser characteristic and the CPU 161 in the engine 160 performs the control for changing the toner density.

As described above, according to the second to fifth embodiments, density adjustment can be performed while an image is being formed, and further, the operator can set the density more easily.

Further, the present invention can be applied to a system constituted by a plurality of devices, or to an apparatus comprising a simple device.

Furthermore, it goes without saying that the invention is applicable also to a case where the object of the invention is attained by supplying a program to a system or an apparatus.

[Modifications to Embodiments]

FIG. 14 shows an example of test printing in a modification to the embodiments of the present invention. The electrophotographic process in this embodiment is similar to that in the above described embodiments, and therefore the explanation will be omitted. In the modification to the embodiment, the image processing apparatus comprises a binarization circuit for performing binarization using dither method or PWM (pulse width modulation) method. The apparatus inputs image data representing, e.g., 256 tones (00H to FFH)(H=hexadecimal representation) and performs printing using a method for representing halftone images by changing ratio of black part to white part within a unit area.

In test printing, respective 00H, 40H, 80H, C0H and FFH tones are printed in densities 1 to 10. Further, a mark indicating a current density level (in FIG. 14, density 5) is also printed. By this arrangement, the user can easily select a desired density level.

Another modification is a color printer which prints various color patterns of combination of different density levels for each color.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus having a test image printing function and a printing density adjustment function, said apparatus comprising:

image forming means for forming an image;

density setting means for setting a printing density of the image to be formed by said image forming means;

generating means for generating a test pattern signal corresponding to a test pattern image; and control means for controlling said density setting means so as to form the test pattern image at a plurality of different printing densities, when said image forming means forms the test pattern image on the basis of the test pattern signal generated by said generating means.

2. The apparatus according to claim 1, wherein said image forming means comprises means for forming an electrostatic latent image and means for developing the electrostatic latent image into a visible image.

3. The apparatus according to claim 2, wherein said density setting means sets the printing density by controlling a developing high-voltage applied to said developing means.

4. The apparatus according to claim 1, wherein said image forming means comprises means for scanning a photosensitive member with a light beam modulated by at least one of an image signal and the test pattern signal.

5. The apparatus according to claim 4, wherein said density setting means sets the printing density by controlling a quantity of the scanning light beam.

6. The apparatus according to claim 1, wherein said generating means generates the test pattern signal corresponding to the test pattern image having a plurality of predetermined patterns identical or similar to each other, and wherein said control means controls said density setting means so that the predetermined patterns can be formed in different densities.

7. The apparatus according to claim 1, further comprising first input means for manually inputting a density instruction and second input means for inputting image data, wherein the apparatus forms an image corresponding to the image data inputted by said second input means in the printing density in accordance with the density instruction inputted by said first input means set by said density setting means.

8. An image forming apparatus having an image density control function, said apparatus comprising:

input means for inputting image data sent from an external image data generating source, said input means further inputting a command for designating a printing density sent from the external image data generating source;

density setting means for setting, in accordance with the command sent from the external image data generating source, the density of an image to be formed on a recording medium;

image forming means for forming an image corresponding to the image data inputted by said input means in the density set by said density setting means; and control means for controlling said density setting means so as to inhibit a change of the printing density during an image forming operation period.

9. The apparatus according to claim 8, wherein said image forming means comprises means for forming an electrostatic latent image and means for developing the electrostatic latent image into a visible image.

10. The apparatus according to claim 8, wherein said image forming means comprises means for scanning on a photosensitive member with a light beam modulated by at least one of an image signal and a test pattern signal.

11. The apparatus according to claim 8, wherein said input means inputs code information as image data, and wherein the apparatus further comprises means for converting the code information inputted by said input means into dot data.

12. The apparatus according to claim 8, further comprising means for manually inputting a density instruction.

13. The apparatus according to claim 12, wherein, if said input means does not input the command for designating a printing density sent from the image data generating source, said image forming means forms the image in the printing density corresponding to the density instruction.

14. The apparatus according to claim 12, wherein said input means inputs the data including the command and the image data in a predetermined unit of data, and wherein if the predetermined unit of data does not include the command, the apparatus forms an image corresponding to the image data included in the predetermined unit of data in the printing density corresponding to the density instruction.

15. The apparatus according to claim 8, wherein the apparatus is connectable with a plurality of image data generating sources, and the apparatus comprises means for storing printing densities corresponding to the respective image data generating sources.

16. The apparatus according to claim 15, wherein said input means inputs data including the command and the image data in a predetermined unit of data, and wherein if the predetermined unit of data includes the command, the apparatus updates the print density corresponding to said image data generating source in said storing means.

17. An image forming method comprising the steps of:
   inputting a command designating a printing density sent from an external image data source;
   setting the printing density of an image to be formed on a recording medium in accordance with the input command in said command inputting step;
   inputting image data sent from the external image data source;
   forming the image on the basis of the image data inputted in said image data inputting step at the printing density set in said density setting step; and
   controlling a printing density so as to inhibit a change of the printing density during an image forming operation period.

18. The method according to claim 17, further comprising a step of manually inputting a density instruction, wherein, if an input command is received, then a printing density is set according to the density setting step, and wherein, if an input command is not received, then the printing density is set in accordance with the density instruction.

19. The method according to claim 17, wherein said image forming step comprises a step of forming an electrostatic latent image and a step of developing the electrostatic latent image into a visible image.

20. The method according to claim 17, wherein said image forming step comprises a step of scanning a photosensitive member with a light beam modulated by an image signal or the test pattern signal.

21. The method according to claim 17, wherein said image data inputting step includes inputting code information as image data, and wherein the method further comprises a step of converting the code information input by said image data inputting step into dot data.

22. An image forming apparatus comprising:
   density setting means for setting a printing density of an image to be formed;
   generating means for generating a test pattern signal corresponding to a test pattern including a pattern indicative of a printing density set by said density setting means and different gray scale patterns; and
   process means for processing the test pattern signal generated by said generating means in accordance with the printing density set by said density setting means, so that an operator can recognize the printing density currently set by said setting means as gradation characteristics of the different gray scale patterns formed in the printing density set by said setting means.

23. The apparatus according to claim 22, wherein the pattern indicative of a printing density represents a pattern of a number, which indicates the printing density set by said density setting means.

24. The apparatus according to claim 22, wherein said apparatus is capable of forming a color image.

25. The apparatus according to claim 22, wherein said process means comprises means for forming an electrostatic latent image and means for developing the electrostatic latent image into a visible image.

26. The apparatus according to claim 22, wherein said process means comprises means for scanning a photosensitive member with a light beam modulated by at least one of an image signal and a test pattern signal.

27. A test pattern image printing method comprising the steps of:
   generating a test pattern signal corresponding to a test pattern image;
   printing the test pattern image on the basis of the test pattern signal; and
   controlling a printing density of the test pattern image printed in said printing step, so that the test pattern image is printed at a plurality of different printing densities.

28. The method according to claim 27, wherein said printing step comprises a step of forming an electrostatic image and a step of developing the electrostatic image, and wherein in said controlling step, the printing density is set by controlling a developing high-voltage in said developing step.

29. The method according to claim 27, wherein said printing step comprises a step of scanning a photosensitive member with a light beam modulated by the test pattern signal, and wherein in said controlling step, the printing density is set by controlling a quantity of the scanning light beam.

30. The method according to claim 27, further comprising a step of setting a printing density of the input image signal.

31. The method according to claim 30, wherein the test pattern image comprises a pattern indicative of the printing density set by said printing density setting step.

32. An image forming method comprising the steps of:
   setting a printing density of an image to be formed;
   generating a test pattern signal corresponding to a test pattern including a pattern indicative of the printing density set in said density setting step and different gray scale patterns; and
   processing the test pattern signal generated in said generating step in accordance with the printing density set in said density setting step, so that an operator can recognize the printing density currently set in said setting step as gradation characteristics of the different gray scale patterns formed in the density status set in said setting step.

33. The method according to claim 32, wherein the pattern indicative of a printing density represents a pattern of a number, which indicates the printing density set in said density setting step.

34. The method according to claim 32, wherein said method is capable of forming a color image.

35. The method according to claim 32, wherein said processing step comprises a step of forming an electrostatic latent image and a step of developing the electrostatic latent image into a visible image.

36. The method according to claim 32, wherein said processing step comprises a step of scanning a photosensitive member with a light beam modulated by at least one of an image signal and a test pattern signal.

37. An image forming method comprising the steps of:

determining whether or not a command designating a printing density received from an external image data source is inputted;

setting a printing density of an image to be formed on a recording medium;

inputting image data received from the external image data source;

forming an image on the basis of image data inputted in said image data inputting step at a printing density set in said density setting step; and storing a manual density instruction in storing means, when a density instruction is manually inputted, wherein, in the density setting step, a printing density is set in accordance with a command when it is determined that a command is inputted in said determining step and is set in accordance with a manual density instruction stored in the storing means when it is determined that a command has not been inputted in said determining step.

38. The method according to claim 37, wherein in said image data inputting step, code information is inputted as image data, and wherein said method further comprises the step of converting the inputted code information into dot data.

39. The method according to claim 37, wherein said image forming step comprises a step of forming an electrostatic latent image and a step of developing the electrostatic latent image into a visible image.

40. The method according to claim 37, wherein said image forming step comprises a step of scanning a photosensitive member with a light beam modulated by an image signal or test pattern signal.

41. An image forming apparatus comprising:

means for determining whether or not a command designating a printing density received from an external image data source is inputted;

means for setting a printing density of an image to be formed on a recording medium;

means for inputting image data received from an external image data source;

means for forming an image on the basis of image data inputted by said image data inputting means at a printing density set by said density setting means; and storing means for storing a manual density instruction, when a density instruction is manually inputted, wherein, said print density setting means sets a printing density in accordance with a command when said determining means determines that a command has been inputted, and sets the printing density in accordance with a manual density instruction stored in said storing means when said determining means determines that a command has not been inputted.

42. The apparatus according to claim 41, wherein said image data inputting means inputs code information as image data, and wherein the apparatus further comprises means for converting code information inputted by said image data inputting means into dot data.

43. The apparatus according to claim 41, wherein said image forming means comprise means for forming an electrostatic latent image and means for developing the electrostatic latent image into a visible image.

44. The apparatus according to claim 41, wherein said image forming means comprises means for scanning a photosensitive member with a light beam modulated by an image signal or test pattern signal.

* * * * *

UNITED STATES PATENT AND TRADEMARK OFFICE
CERTIFICATE OF CORRECTION

PATENT NO. : 5,502,550
DATED : March 26, 1996
INVENTOR(S) : KENJIRO HORI, et al.

It is certified that error appears in the above-indentified patent and that said Letters Patent is hereby corrected as shown below:

COLUMN 16

Line 31, "comprise" should read --comprises--.

Signed and Sealed this

Thirteenth Day of August, 1996

Attest:

BRUCE LEHMAN

Attesting Officer    Commissioner of Patents and Trademarks